Dec. 23, 1952     J. WILSON     2,622,709
BRAKE ADJUSTER
Filed Aug. 30, 1946     3 Sheets-Sheet 1
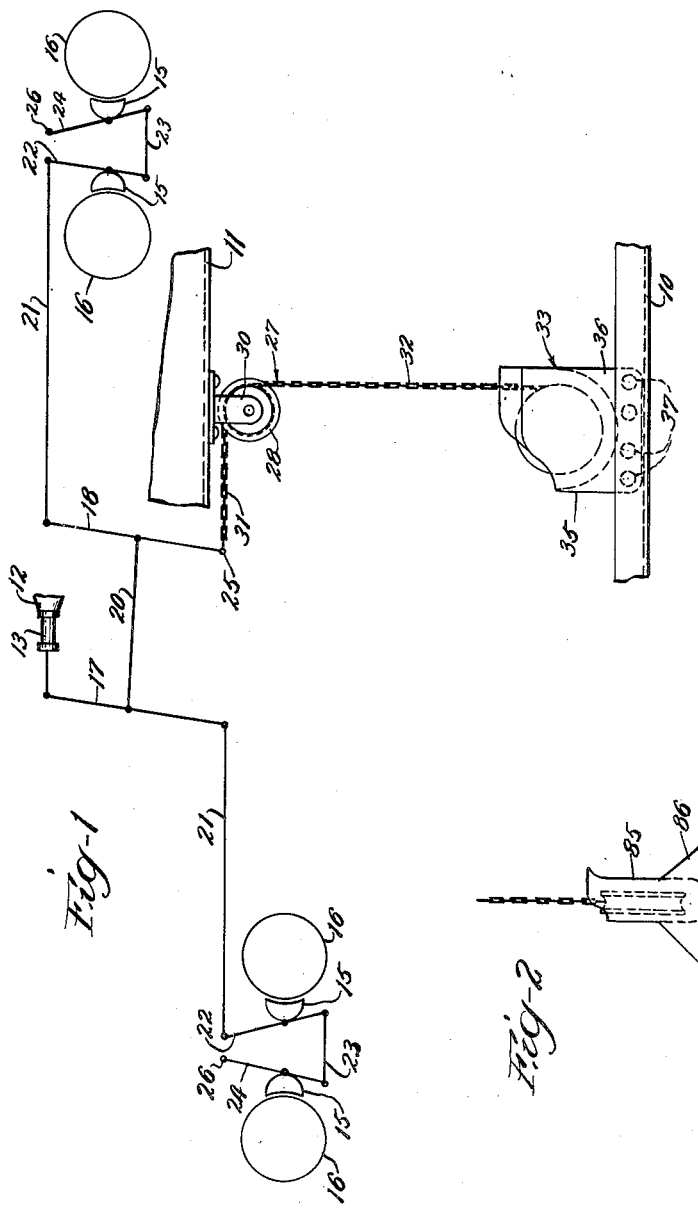
Inventor
Jack Wilson.

Dec. 23, 1952    J. WILSON    2,622,709
BRAKE ADJUSTER
Filed Aug. 30, 1946    3 Sheets-Sheet 2
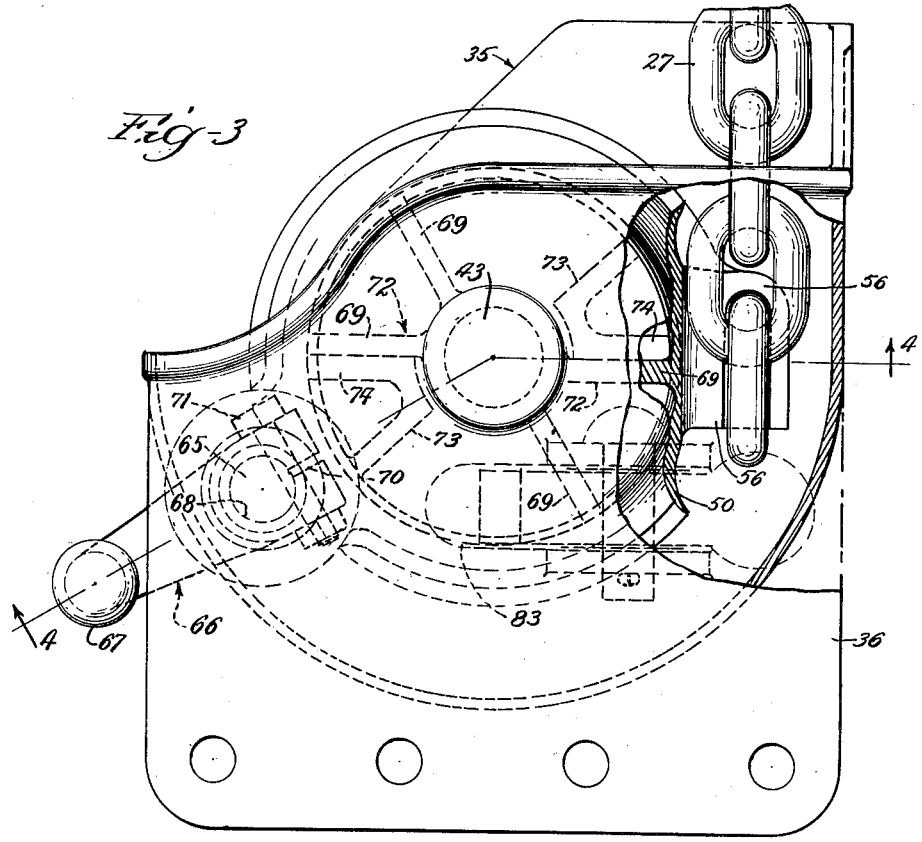
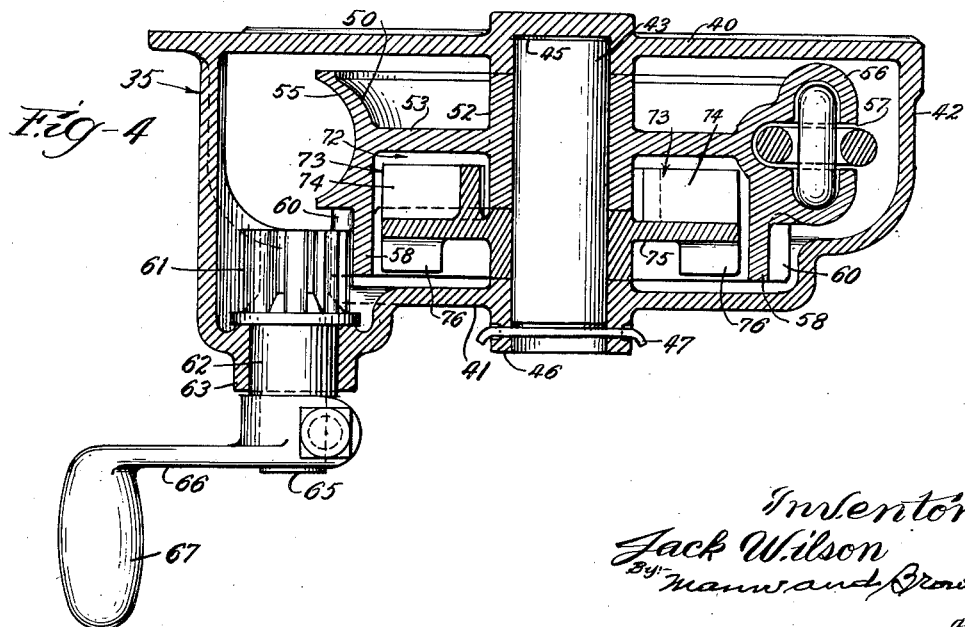
Inventor
Jack Wilson

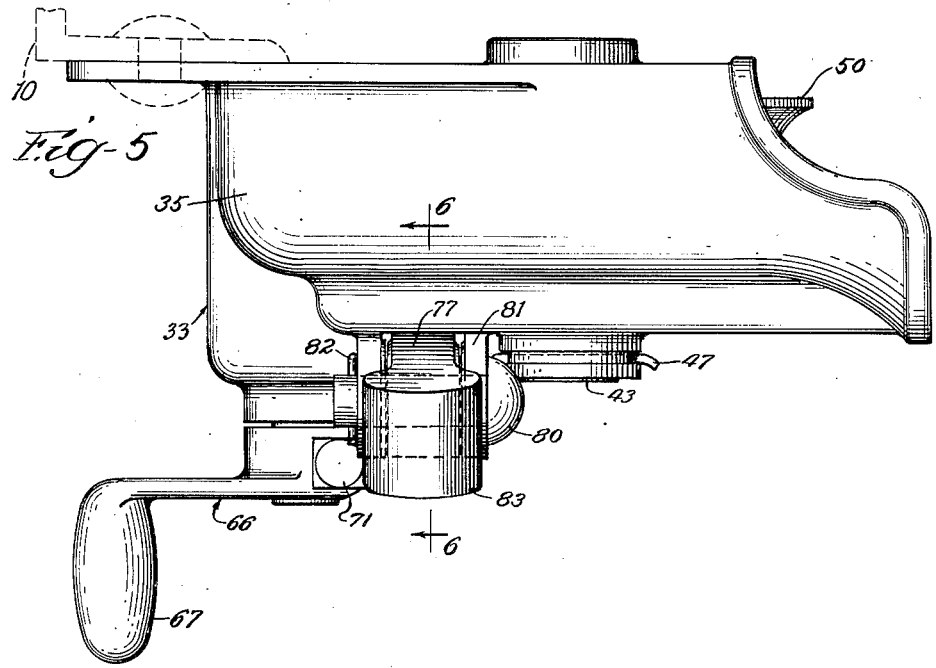
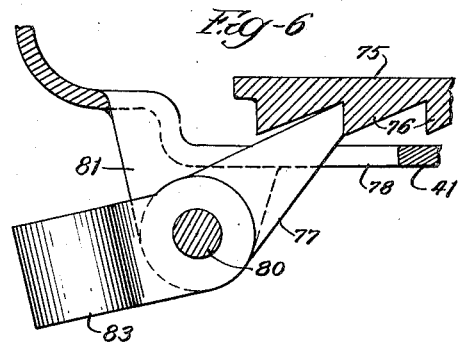
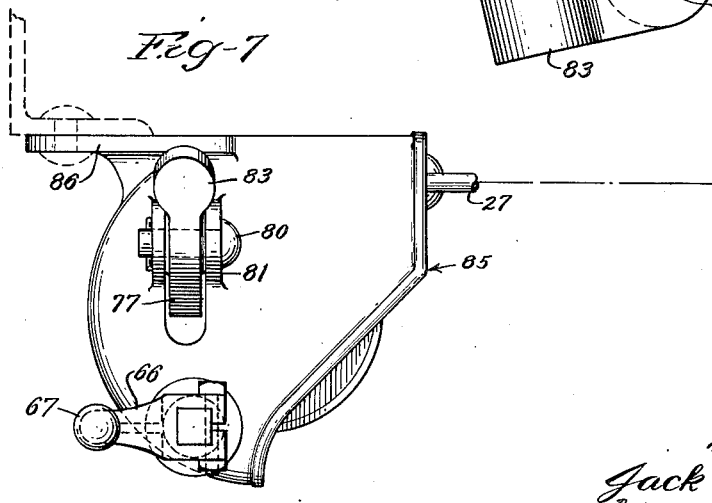

Patented Dec. 23, 1952

2,622,709

UNITED STATES PATENT OFFICE 2,622,709

BRAKE ADJUSTER

Jack Wilson, Chicago, Ill., assignor to Universal Railway Devices Co., a corporation of Delaware Application August 30, 1946, Serial No. 693,965

1 Claim. (Cl. 188—197)

My invention relates to brake adjusters or slack adjusters for the foundation brake gear of railway cars, with special reference to freight cars.

A major purpose of my invention is to facilitate the operation of a slack adjuster on a typical railway freight car. Such a slack adjuster must be operated periodically as the brake shoes wear down. The ease of such operation depends on the convenience of operation and on accessibility of the slack adjuster.

I propose to eliminate any necessity whatsoever for an inspector to crawl under the car to actuate the device for slack adjustment. For further convenience and time saving in this respect I propose to provide the slack adjuster with permanent means for manual actuation, thereby avoiding the necessity of fitting any tool or accessory to the adjuster for slack take-up.

With reference to the inspecting, servicing and repairing of the slack adjuster, per se, an important object of my invention is to have the majority of the working parts concentrated in a single unit fully accessible to a workman standing safely beside the car, and to have the remaining more remote working parts of the slack adjuster mechanism of such open construction as to be fully exposed to view from the side of the car.

In general these objects are attained by incorporating the principal working parts required for slack take-up in a compact unit mounted under the car immediately adjacent the car side and operatively connecting this unit to the foundation brake gear of the car by a flexible means, such as a chain, extending inward from the unit transversely of the car, means being provided to transmit the take-up force to the brake gear in a direction more or less longitudinal of the car. A feature of my preferred practice is the concept of placing a direction-changing sheave, or like means, for the chain both in longitudinal alignment with the brake gear and in transverse alignment with the take-up unit at the side of the car, the chain being thus formed to an angle with a longitudinal leg of the chain connected to the brake gear and a lateral leg of the chain connected to the take-up unit.

One result of employing a slack adjusting chain with change in direction to permit the chain to extend transversely of the car is that the transversely extending portion of the chain serves the function of transmitting actuating forces that is usually performed by a relatively long transverse shaft. I eliminate the need for a long heavy shaft with substantial saving in weight. In this regard a feature of the invention is that only an exceptionally short shaft means is employed, and that this relatively short means serves merely as a journal for rotary elements and is never stressed in torsion, either to transmit force to a rotary element thereon or to resist force from such rotary element.

One problem to which my invention is directed is that of providing a manually operable means, such as a crank or hand wheel for operating a slack adjuster, with the manual means so constructed and so positioned that it may be manipulated by a man standing comfortably beside the car.

In providing for such convenience on the part of the operator it is essential that the permanently installed operating means under the car be close to the level of the side sill of the car. It is further essential that the operating means be within the permissible line of clearance for the car. If the operating means is a crank, the orbit of the crank should not be such as to require the operator to reach an undue distance under the car in carrying the crank to the furthermost point of the orbit.

In some well known types of slack adjusters a shaft extends laterally from the side of the car toward the center sill, and if a crank were permanently mounted on the outer end of such shaft the crank would rotate in a vertical plane. If such a vertically rotating crank is substantially entirely under the car, as it should be, and if the crank has a substantial radius, as is usually required, the axis of rotation of the crank must be relatively low, and, of course, the crank orbit will extend much lower. The objections to such an arrangement on the outer end of a transverse shaft are obvious and account for the fact that the outer ends of such transverse shafts are not commonly provided with cranks, the shafts usually being merely adapted for rotation by the application of suitable tool or other accessory means.

In the present invention various features work together to the end that the slack adjuster may be actuated with maximum convenience by an operator standing beside the car. In the first place, the extension of the slack adjusting chain to the side of the car makes it possible to employ a take-up means rotating about an axis in a longitudinal vertical plane of the car, instead of in a transverse plane. Thus in one practice of my invention the axis of rotation is upright and the crank rotates in a horizontal plane. In the second place, I provide an exceptionally compact take-up unit so that when a horizontally rotating crank is used the crank may be placed at a substantial distance above ground level, in other words, relatively close to the under side of the car. In the third place, I employ a relatively short-throw crank so that the vertical axis of the crank may be relatively close to the side of the car and only a moderate reach under the car will be required for actuation of the crank.

Other objects of the invention include the following: to provide a slack adjuster that may be included in the original construction of cars or may, with facility, be sold as a unit for installation on existing cars; to provide a slack adjuster incorporating a chain-winding sheave in which the forces for rotating the sheave in one direction to take up slack and for opposing rotation in the other direction are applied directly to the sheave itself at a relatively great distance from the sheave axis; to provide a compact, self-contained take-up unit that may be mounted in operative position immediately adjacent the side of the car; to provide in such a unit permanent operating means, such as a hand wheel or crank, of such short radius or throw as to stay within the permissible clearance lines of the car when the take-up unit is mounted close to the side of the car; and to provide in combination with such short radius operating means a suitable gear arrangement in the unit to multiply the force exerted by the short radius operating means, thereby to make the short radius operating means as effective as a long radius operating means.

The above and other objects of the invention will be apparent in the detailed description to follow, taken with the accompanying drawings.

In the drawings, which are to be regarded merely as illustrative:

Fig. 1 is a semi-diagrammatic view showing an application of the slack adjuster to the foundation brake gear of a standard freight car;

Fig. 2 indicates how the arrangement in Fig. 1 may be modified by the substitution of an upright take-up unit for a horizontal take-up unit;

Fig. 3 is a top view of the take-up unit in Fig. 1, with certain parts broken away;

Fig. 4 is a section taken as indicated by the angular line 4—4 of Fig. 3;

Fig. 5 is a side elevation of the same take-up unit;

Fig. 6 is a fragmentary section taken as indicated by the line 6—6 of Fig. 5; and Fig. 7 is a side elevation of the take-up unit shown in Fig. 2.

In Fig. 1 numeral 10 indicates the side sill or equivalent part of a railway car, and numeral 11 designates the center sill or equivalent central structural member. A brake cylinder 12, by means of a piston rod 13, actuates the foundation brake gear of the car to apply the brake shoes 15 to the car wheels 16. The brake gear includes the usual live cylinder lever 17, dead cylinder lever 18, tie rod 20, top rods 21, live truck levers 22, intermediate rods 23, and dead truck levers 24.

In the present embodiment of the invention, adjustment of the foundation brake gear is accomplished by shifting the fulcrum 25 of the dead cylinder lever or floating lever 18, but it will be understood that such adjustment may also be attained in other ways, for example, by shifting the fulcrums 26 of the dead truck levers 24.

The shifting of the selected fulcrum 25 of the dead cylinder lever 18 is accomplished by attaching thereto a suitable connecting means, in this instance a flexible means in the form of a chain 27. The chain 27 cooperates with suitable means for change in direction, preferably a suitable sheave 28 mounted in a bracket 30 on the center sill 11. The chain 27 is formed to an angle, with one leg 31 extending generally longitudinally of the car to connection with the foundation brake gear, and the other leg 32 extending generally transversely from the direction-changing sheave 28 to what may be termed a take-up unit, generally designated 33. Thus the direction-changing sheave 28 is in substantially longitudinal alignment with the point of adjustment of the foundation brake gear and is in lateral alignment with the take-up unit 33.

The take-up unit 33 includes a housing 35 having an integral flange 36 by means of which the unit may be attached to the side sill 10 by suitable rivets 37. The housing 35 has a top wall 40, a bottom wall 41, and a peripheral wall 42 that is incomplete, the housing being open on its inner side. A suitable vertically extending stub shaft 43 is mounted inside the housing 35, with the upper end of the shaft seated in a socket 45 in the upper housing wall 40 and the lower end of the shaft embraced by a collar 46 formed in the bottom wall 41. The shaft 43 may be retained in its assembled position by suitable means, such as a wire or cotter pin, Fig. 4 showing a bent plate 47 for this purpose.

As best shown in Fig. 4, rotatably mounted on the stub shaft 43 is a suitable sheave or drum 50 having a hub 52, a radial web 53, and a concave felly 55. The sheave 50 serves as reeling means to take up the chain 27, and therefore may be formed with the usual anchoring pocket 56 to engage the chain. In the usual manner the anchoring pocket 56 has a radial slot 57 through which one link of the chain may extend, with the next adjacent link inside the pocket positioned transversely of the slot. The chain may be anchored against dislodgment from the pocket by any suitable means, such as a cotter pin (not shown).

It is contemplated that a gear train will be employed to actuate the sheave 50, and that for this purpose a relatively large gear will be united with the sheave for rotation therewith. In the present construction the required gear is integral with the sheave 50, the sheave being formed with a concentric cylindrical skirt 58 having peripheral gear teeth 60.

In mesh with the gear teeth 60 is a suitable pinion 61 inside the housing 35, the pinion having a journal portion 62 embraced by a bearing 63, the bearing being formed in the bottom wall of the housing. An axial extension 65 of the pinion 61 extends outside the housing to carry a suitable crank 66 with a downwardly extending handle 67. The crank 66 may be mounted on the pinion extension 65 in any suitable manner. As best illustrated in Fig. 3, the base of the crank has an aperture 68 to fit over the pinion extension 65, and is provided with a split, as indicated at 70, whereby a suitable bolt 71 may be employed to tighten the crank into engagement with the pinion extension.

In an actual installation the radius or throw of the crank 66 may be, for example, on the order of 3″, but the gear teeth 60 on the sheave 50 are on a diameter approximately four times the diameter of the pinion 61, so that the 3″ crank 66 has the same effectiveness in applying force to the sheave 50 as a 12″ crank. It will be noted in Fig. 5 that the short-throw crank 66 is directly under the side sill 10 and thus is immediately adjacent the side of the car. In rotating the crank by the handle 67 the operator's hand traverses a horizontal circle, the innermost point of which is only about 6" in from the car side.

As heretofore mentioned, one consideration in the convenience of operation of the crank 66 is the elevation of the crank from ground level, that is to say, the nearness of the horizontal crank orbit to the bottom of the car represented by the side sill 10. Inasmuch as the crank is mounted on the under side of the take-up unit 33 so that the thickness of the take-up unit determines the spacing of the crank downward from the car bottom, the more compact the take-up unit in vertical dimension the higher the elevation of the crank.

As heretofore mentioned, a feature of my invention is the compactness of the take-up unit 33, and in this first embodiment the compactness is in vertical dimension. Important to this aspect of the invention is the concept of utilizing the circular space defined by the radial sheave web 53 and the cylindrical skirt 58 for completely housing the additional mechanism that is required to both limit reverse rotation of the sheave 50 and to provide lost motion for normal brake slackness. By in effect nesting the additional brake adjusting mechanism inside the combined sheave and gear I incorporate the required additional structure in the described arrangement without adding to the vertical dimension.

The additional structure includes a pair of dimetrically positioned shoulder means, generally designated 72 (Fig. 3), integral with the sheave web 53, each of the two shoulder means 72 comprising two spaced radial ribs 69. The two shoulder means 72 are in the same plane of rotation as two similar diametrically positioned shoulder means generally designated 73 that are formed by ribs 74 integral with a ratchet wheel 75. The ratchet wheel 75 is mounted on the stub shaft 43 within the space defined by the circular skirt 58, the ratchet wheel having the afore-mentioned shoulders 73 on one face and having suitable ratchet teeth 76 on the other face.

A suitable pawl 77 (Figs. 5 and 6) is mounted on the under side of the housing 35 for engagement with the ratchet teeth 76. As best shown in these figures the pawl extends through a slot 78 in the housing wall and is mounted by a headed pivot pin 80 in a bracket 81 integral with the housing, the headed pin being retained by a cotter pin 82. The pawl 77 has a weighted arm 83 that normally biases the pawl into engagement with the ratchet teeth, this arm being conveniently positioned for manual release.

The manner of operation of the described slack adjusting mechanism may be readily understood from the foregoing description. Normally the take-up sheave 50 is stationary, with the sheave shoulders 72 in abutment with the ratchet wheel shoulders 73. Whenever it is desired to take up slack in the foundation brake gear the crank 66 will be rotated to actuate the sheave 50 for reeling or taking up the chain 27. Initial rotation of the take-up sheave 50 will carry the sheave shoulders 72 through several degrees of lost-motion rotation, whereupon the sheave shoulders will again abut the ratchet wheel shoulders from the opposite sides of the latter shoulders and continued rotation of the take-up sheave will cause corresponding rotation of the ratchet wheel 75. During such rotation of the ratchet wheel the pawl 77 rides over the ratchet teeth 76.

When the tension of the chain 27 precludes further manual rotation, the crank 66 is released, whereupon subsequent brake-applying force transmitted by the chain causes reverse movement of the sheave. The reverse movement of the sheave is stopped by return of the sheave shoulders 72 into normal abutment with the ratchet shoulders 73, the sheave being then locked against further reverse rotation by the engagement of the pawl 77 with the ratchet teeth 76.

When worn brake shoes are to be replaced the pawl 77 is manually released from engagement with the ratchet teeth 76 to permit the ratchet wheel and the sheave 50 to rotate in reverse direction until sufficient slackness is created in the brake gear to permit the installation of new brake shoes. After the new shoes are installed the crank 66 is rotated as heretofore described, to take up the slack in the brake gear to the required extent for resuming operation.

Fig. 2 indicates how the described arrangement may be modified by employing a take-up unit that is upright to function on a horizontal axis instead of a vertical axis. Fig. 7 shows the same unit in side elevation.

The take-up unit 85, shown in Figs. 2 and 7, is largely identical in construction with the first described take-up unit 33, as indicated by the use of corresponding numerals to indicate corresponding parts. In this modification the housing of the take-up unit has an integral flange 86 for attachment to the side sill 10 of the car, which flange is located and adapted to support the housing in upright position. As indicated in Fig. 7, the crank 66 is now rotatable in a vertical plane and is at a greater spacing below the car bottom. The short throw of the crank, however, makes the construction practical, and the lowermost point of the short-throw crank orbit is high enough for convenient reach by a man standing beside the car.

While the axis of the take-up sheave and the axis of rotation of the crank are vertical in the first form of the invention and horizontal in the second form of the invention, nevertheless in both forms these axes lie in vertical planes that are generally longitudinal with respect to the car, whereas in the usual slack adjusters of the present general type such axes would lie in planes transverse to the car. Thus in both of the described practices of the invention the provision of such means as the direction-changing sheave 28 makes it possible to change the location and the orientation of the take-up sheave with the resulting advantages heretofore pointed out.

The vertical positioning of the take-up unit in the first embodiment of the invention, and the horizontal positioning of the unit in the second embodiment, may be regarded as representing two limits of a range of positions. In other words, the unit may be inclined to various degrees between the two extremes. Throughout the range of positions, however, the rotary axis of the unit will lie in a plane that is generally longitudinal with respect to the car.

My description in specific detail of the preferred practices of the invention set forth for the purpose of disclosure and to illustrate the principles involved will suggest to those skilled in the art various changes and substitutions within the scope of the appended claim.

I claim as my invention:

In mechanism for adjusting the position of the fulcrum for a dead lever of the foundation brake gear of a railway car having a car body, the combination of a rotary reeling device mounted on the under side of the car body adjacent one side thereof for ready access to and manipulation from said side, said reeling device comprising a housing, a drum journalled in the housing and having its pivotal axis lying in a vertical plane adjacent to and parallel with said side of the car body whereby a tangent to the drum extends transversely of the car, a flexible connecting means secured at one end to the drum and at the other end to said fulcrum, a direction-changing sheave mounted on the under side of the car body over which said connecting means passes, said sheave being located adjacent the center of the car in substantial alignment longitudinally of the car with said fulcrum, a relatively large gear fixed to the drum, a relatively small pinion gear journalled in the housing and in mesh with the larger gear, manually rotatable means projecting from the housing and accessible from said car side for rotating the pinion gear to thereby move said fulcrum with mechanical advantage to brake setting position, a ratchet wheel journalled in the housing having a lost motion connection with said drum corresponding to normal brake shoe clearance, and a holding pawl mounted in the housing releasably engaging the ratchet wheel to hold it against retrograde movement but being adapted to ride over the ratchet wheel to a new position of adjustment whenever said manually rotatable means is rotated by an amount corresponding to excess brake gear travel.

JACK WILSON.

REFERENCES CITED

The following references are of record in the file of this patent:

UNITED STATES PATENTS

| Number | Name | Date |
|---|---|---|
| 601,450 | Shedlock | Mar. 29, 1898 |
| 722,989 | Kennelly | Mar. 17, 1903 |
| 909,232 | Sauvage | Jan. 12, 1909 |
| 1,192,420 | Harter et al. | July 25, 1916 |
| 1,858,520 | O'Connor | May 17, 1932 |
| 1,964,138 | Pietzsch et al. | June 26, 1934 |
| 1,971,368 | Camp | Aug. 28, 1934 |
| 2,136,563 | Piron | Nov. 15, 1938 |
| 2,254,989 | Benson | Sept. 2, 1941 |
| 2,278,681 | Thul | Apr. 7, 1942 |
| 2,336,691 | Kenney | Dec. 14, 1943 |